March 17, 1970 — G. C. ASHER — 3,500,969
PLURAL ACTUATED DISC BRAKE MECHANISM AND ADJUSTING MEANS THEREFOR
Filed Jan. 17, 1968 — 2 Sheets-Sheet 1

INVENTOR.
GEORGE C. ASHER
BY
THEIR ATTORNEYS

March 17, 1970  G. C. ASHER  3,500,969
PLURAL ACTUATED DISC BRAKE MECHANISM
AND ADJUSTING MEANS THEREFOR
Filed Jan. 17, 1968  2 Sheets-Sheet 2

INVENTOR.
GEORGE C. ASHER
BY
THEIR ATTORNEYS

# United States Patent Office 3,500,969
Patented Mar. 17, 1970

3,500,969
PLURAL ACTUATED DISC BRAKE MECHANISM AND ADJUSTING MEANS THEREFOR
George C. Asher, Northridge, Ohio, assignor of one-half to Forrest Ray Johnson, New Lebanon, Ohio
Filed Jan. 17, 1968, Ser. No. 698,525
Int. Cl. F16d 65/14, 65/38, 55/00
U.S. Cl. 188—106                                 7 Claims

ABSTRACT OF THE DISCLOSURE

A mechanically operated "emergency" brake system for primarily hydraulically operated disc brakes includes a mechanically applied push rod passing through the hydraulic cylinder and piston. Using a caliper, pressure is applied to both sides of a brake disc during both hydraulic and mechanical operation. A self-adjustment is provided by a drag ring encircling the hydraulically operated piston. In one embodiment the mechanism for mechanically operating the brakes includes a rotatable lever and a ratchet mechanism for intermittently adjusting the position of the rotatable lever.

---

This invention relates to a brake mechanism and more particularly to a combined hydraulic and mechanical device for applying pressure to both sides of a brake disc.

Disc brakes are considered to have numerous advantages for use in automobiles and trucks not found in more conventional drum brake mechanisms. However, disc brakes have not become widely accepted for various reasons. One of these reasons is that a satisfactory, safe and reasonably inexpensive mechanical or "emergency" brake mechanism has not been developed. Therefore, many United States automobile manufacturers provide disc brakes as optional accessories but only for the front wheels of vehicles. Various solutions have been suggested for emergency or mechanical braking. Some of these solutions involve entirely separate brake mechanisms either acting upon the rear wheel brake discs or upon the vehicle drive shaft. Other solutions have involved the use of relatively complex mechanisms for mechanically applying pressure to the brake discs in the same area as the hydraulically operated mechanisms. The latter solutions typically involve several moving parts and are expensive to manufacture.

An object of this invention is to provide a combined hydraulically and mechanically operated brake mechanism. This is accomplished in accordance with this invention by passing part of a mechanical brake actuating mechanism through the hydraulic mechanism. Thus, both the hydraulic and the mechanical mechanisms engage and actuate the same braking members. However, the mechanical mechanism, because it passes through the hydraulic mechanism, does not interfere substantially therewith. The mechanical mechanism may be operated by a conventional emergency brake cable system of the type having a hand or foot controlled operating member conveniently near the vehicle driver.

A further object of this invention is to provide a new and improved self-adjustment for disc brakes. This involves the use of a drag ring encircling the hydraulically operated piston, which drag ring is tightly held in the hydraulic cylinder. The drag ring serves as a stop for limiting the maximum separation between the brake disc and the piston. As the brake linings become worn the drag ring is automatically advanced toward the brake disc.

Still another object of this invention is to provide an improved self-adjustment means for a rotating brake actuating arm or lever. To this end, a ratchet mechanism is provided for intermittently changing the released position of the brake actuating arm or lever relative to the brake linings as the brake linings become worn.

Other objects will become apparent from the following description and the drawings in which.

Figure 1:
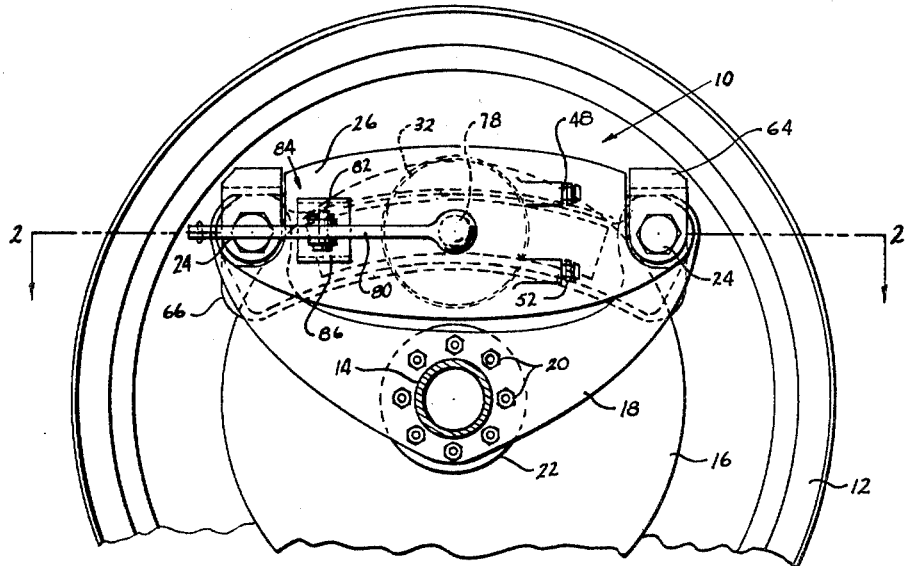
FIGURE 1 is an elevational view with parts in cross section and parts broken away of a vehicle wheel provided with a brake mechanism in accordance with this invention.
Figure 2:
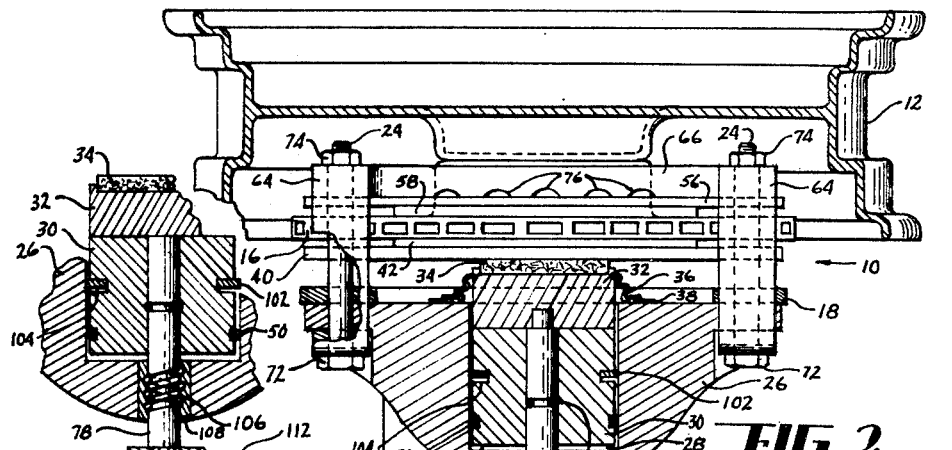
FIGURE 2 is a transverse cross sectional view of the wheel and part of the brake mechanism as viewed in the direction of arrows 2—2 of FIGURE 1, other parts of the brake mechanism being illustrated in plan view.

Referring to FIGURES 1 and 2, a brake mechanism 10 in accordance with this invention is shown in association with a vehicle wheel 12 which may be driven in a conventional manner by a vehicle rear axle (not shown) in a rear axle housing 14. The brake mechanism 10 includes a brake disc 16 which rotates with the wheel 12 and is attached thereto in any suitable fashion. The brake mechanism 10 further includes a bifurcated brake support member 18 mounted by bolts 20 to an annular flange 22 which may be integral with or fixedly connected to the axle housing 14. As apparent, the axle housing 14 and accordingly the support member 18 and the elements to be described below mounted thereon do not rotate with the wheel 12 or the brake disc 16.

As best shown in FIGURE 2, a pair of mounting bolts 24 pass through apertures in the legs of the support member 18 and mount a cylinder housing 26 thereon which has a cylindrical chamber 28 therein slidably receiving a brake actuating piston 30. It will be observed that the piston 30 is axially slidable along an axis parallel to the axis of rotation of the brake disc 16. Also slidably received in the cylindrical chamber 28 is a cylindrical brake engaging member 32 having a wear pad 34 on its outer end. The brake engaging member 32 and the wear pad 34 project a considerable distance beyond the base of the cylinder housing 26 opening to the cylindrical chamber 28. A ring-shaped dust cover or boot 36 having an internal margin received within an annular groove in the brake engaging member 32 and an outer margin clamped to the base of the cylinder housing 26 by an annular clamp 38 may be used to protect the cylindrical chamber 28 from dust and other foreign matter.

Figures 3, 4, 5:
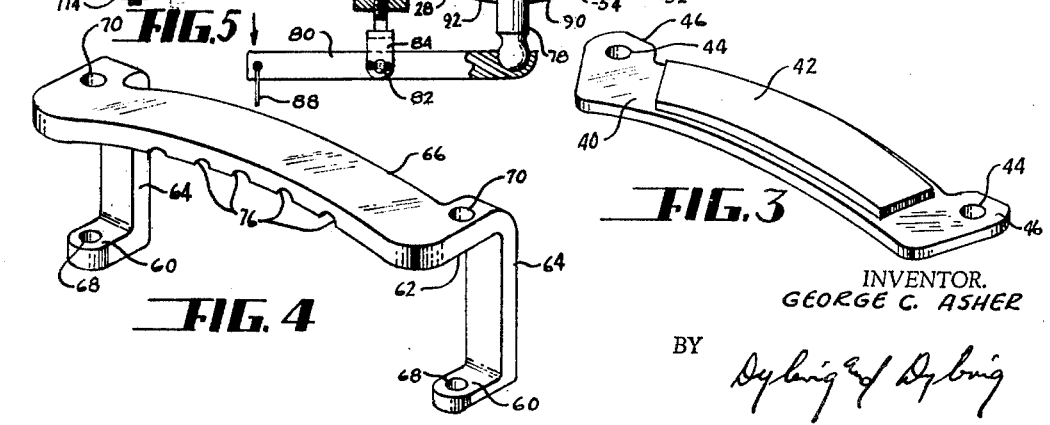
FIGURE 3 is a perspective view of a brake shoe of a type which may be used with the brake mechanism of this invention.
FIGURE 4 is a perspective view of a caliper forming part of the mechanism of this invention.
FIGURE 5 is a transverse cross sectional view of a portion of a modified brake mechanism made in accordance with this invention.

With reference to FIGURES 2 and 3, a brake shoe 40 having a friction brake lining 42 is engageable with one side surface of the brake disc 16. The brake shoe 40 has apertures 44 through upstanding ear portions 46 thereof which slidably receive the mounting bolts 24 for mounting of the brake shoe 40 between the wear pad 34 and the brake disc 16 in such a position that the longitudinal axis of the piston 30 passes centrally through the brake shoe 40 and its lining 42.

A pressure fluid such as a hydraulic brake fluid is introduced to the inner end of the cylindrical chamber 28 through a fluid pressure port 52 and a passageway 54 in the cylinder housing 26 for applying pressure to the brake actuating piston 30. An O-ring pressure seal 50 located in an annular groove in the piston 30 and engaging the wall of the cylindrical chamber 28 provides a seal confining the pressure fluid to the inner end of the cylindrical chamber 28. As apparent, the introduction of fluid under pressure into the cylindrical chamber 28 causes the piston 30 to advance toward the brake shoe 40 whereupon the brake lining 42 is forcibly brought into frictional engagement with one face of the brake disc 16. Release of the fluid under pressure will result in a slight movement of the piston 30 away from the brake shoe 40 and, accordingly, there will be little or no frictional engagement between the brake lining 42 and the surface of the brake disc 16. Fluid under pressure can be supplied to the port 52 by means of a conventional brake fluid distribution system and for this purpose it will be understood that a fluid brake line will be attached to the outer end of the fluid pressure valve 48. For checking the brake system or relieving the brake system of air, a conventional bleeder valve 48 (FIGURE 1) is mounted externally of the housing 26 and connected to the inner end of the cylindrical chamber 28 by a bleeder passageway similar to the passageway 54 illustrated in FIGURE 2.

A second brake shoe 56, which may be identical to the brake shoe 40, is slidable on the mounting bolts 24 and has a brake lining 58 engageable with the opposite face of the brake disc 16. The second brake shoe 56 is forcibly brought into engagement with the brake disc 16 upon movement of the cylinder housing 26 away from the brake disc 16 when fluid under pressure is introduced through the fluid pressure port 52. Referring to FIGURES 2 and 4, confronting faces 60 and 62 in a pair of inverted U-shaped ends 64 of a brake caliper 66 have pairs of aligned apertures 68 and 70 therein also slidably receiving the mounting bolts 24. The inverted U-shaped ends 64 straddle the two brake shoes 40 and 56 and part of the housing 26, the arrangement being such that the confronting surfaces 60, 62 engage the rear of the housing 26 and the rear of the brake shoe 56, respectively. A head 72 on one end of each mounting bolt 24 and a nut 74 threaded on the other end of each bolt 24 engage the outer surfaces of the caliper ends 64 and thereby maintain the desired alignment of the housing 26, the brake shoes 40, 56 and the caliper 66. Movement of the cylinder housing 26 away from the brake disc 16 when pressure fluid is introduced therein directly results in a force transmitted by the caliper 66 causing the brake lining 58 to be forcibly brought into frictional engagement with one side of the brake disc 16 at the same time as the brake lining 42 is forcibly brought into frictional engagement with the other side of the brake disc 16, whereupon the rotation of the brake disc 16 is decelerated or braked. To better dissipate heat resulting from the frictional engagement of the brake lining 58 with the brake disc 16, the face of the caliper 66 engaging the brake shoe 56 is provided with several air cooling grooves or passageways 76.

In accordance with this invention the brake mechanism 10 also includes mechanically or manually operated means for forcibly applying the brake linings 42 and 58 to the brake disc 16 for use as a parking brake or for use in the event the hydraulic system fails. Referring to FIGURE 2, a push rod 78 is slidably mounted in both the cylinder housing 26 and the piston 30 with its longitudinal axis coaxial with the chamber 28 and the piston 30. The end of the push rod 78 nearest the brake disc 16 is connected to the center of the cylindrical brake engaging member 32. The push rod 78 could be made integral with the brake engaging member 32 or could be press fit therein as illustrated or connected thereto in any other suitable fashion. A lever 80 having a socket at one end thereof receiving the ball-shaped exterior end of the push rod 78 may be used for mechanically applying a force to the push rod 78. A mid-portion of the lever 80 is pivotally mounted on the housing 26 by a pivot pin 82 passing through the lever 80 and aligned apertures in a clevis 84 threadedly received in a bracket 86 mounted on the cylinder housing 26. A force applied to the end of the lever 80 remote from the push rod 78 in a counterclockwise direction as indicated by the arrow in FIG. 2, will cause the lever 80 to pivot about the pivot pin 82 whereupon the push rod 78 is advanced toward the brake disc 16. The mechanical force so applied to the push rod 78 results in the brake engaging member 32 with its wear pad 34 urging the lining 42 of the brake shoe 40 into forcible frictional engagement with the brake disc 16. Simultaneously, because the lever 80 is mounted on the cylinder housing 26, the cylinder housing 26 will be pulled away from the brake disc 16 whereupon, as in the case of the hydraulic operation described above, the force applied to the cylinder housing 26 will be transmitted by the caliper 66 to the brake shoe 56 so that the brake disc 16 is gripped from both sides by the brake linings 42 and 58. Mechanical force can be applied as indicated by the arrow in FIGURE 2 by means of a conventional manually operated remote brake lever (not shown) convenient to the vehicle driver, and acting through a conventional brake cable system including a cable 88 connected to the free end of the lever 80.

An O-ring seal 90 located in a groove in the push rod 78 and acting against the surrounding wall of the piston 30 and a pressure seal 92 press fit in the housing 26 and acting against the push rod 78 prevent escape of the brake operating fluid from the chamber 30 around the push rod 78. It will be noted that the mechanical actuation of the brake is essentially independent of the hydraulic operation since the push rod 78 is slidably mounted in the piston 30. To avoid drawing the piston 30 toward the brake disc 16 upon mechanical actuation, the confronting contacting surfaces of the piston 30 and the brake engaging member 32 should not be too smooth or polished. It may even be desirable to reduce the contact area therebetween by cutting grooves in either the end of the piston 30 or the confronting end of the brake engaging member 32.

To accommodate wear of the brake linings 42 and 58, a drag ring 102 is located within an annular groove 104 in the periphery of the piston 30, and is pressed by force within the cylindrical chamber 28. The axial thickness of the drag ring 102 is less than the axial width of the groove 104. Because of the force fit of the drag ring 102 in the cylindrical chamber 28, a considerable force is required to move the drag ring 102 axially along the chamber 28. The pressure seal 50 is located between the drag ring 102 and the inner end of the cylindrical chamber 28. During ordinary operation of the brakes, therefore, the drag ring 102 is not moved. The drag ring 102 may be a split ring construction and should have an air gap or aperture therein permitting air to flow freely into and out of the cavity between the split ring 102 and the pressure seal 50. If the brake linings 42 and 58 become worn to the extent that the face of the groove 104 farthest from the brake disc 16 engages the confronting face of the drag ring 102 as hydraulic pressure is applied, the drag ring 102 will be forcibly advanced toward the brake disc 16. In FIGURE 2 it will be noted that the face of the groove 104 closest to the brake disc 16 is engaged with the confronting face of the drag ring 102. Accordingly, the drag ring 102 acts as a stop which limits the distance by which the piston 30 can withdraw from the brake disc 16 when no braking pressure is applied thereto. In the event the drag ring 102 is advanced toward the brake disc 16 due to wear of the brake lining 42 and 58, the piston 30 will subsequently withdraw by a lesser distance from the brake disc 16 when braking pressure is released. In practice, the brake linings 42 and 58 will be lightly engaged with the brake disc 16 even when no braking pressure is applied. Typically, movement of the piston 30 to apply a braking force is approximately 40 thousandths of an inch. For this reason the axial width of the groove 104 (which is exaggerated in FIGURE 2) should be slightly more than 40 thousandths of an inch greater than the axial thickness of the drag ring 102.

Because of the self-adjustment feature accommodating brake lining wear described above, it will be observed that the brake engaging member 32 will be repositioned upon movement of the drag ring 102 and, because of its connection to the member 32, the push rod 78 will also be repositioned or advanced toward the brake disc 16 as the brake linings 42 and 58 become worn. This advancement of the push rod 78 is of course away from the lever 80. The pivot assembly shown in FIGURE 2 for pivotally mounting the lever 80 on the cylinder housing 26 is so designated that it can easily be taken apart and the threaded shank of the clevis 84 threadedly advanced deeper into the bracket 86. Upon reassembly, then, the lever 80 will be drawn closer to the brake disc 16 whereupon the socket end of the push rod 78 will again be properly seated.

The brake mechanism described above can conveniently be used on the rear wheels of vehicles where both a hydraulic and a mechanical brake operation are desired. The brake mechanisms for the front wheels of the vehicle could be quite similar except that the provision for mechanical operation supplementing hydraulic operation normally would not be made.

FIGURE 5 shows a modification of the mechanism for mechanically advancing the brake linings 42 and 58 toward the brake disc 16. In FIGURE 5, parts identical or nearly identical to those in FIG. 2 have been given the same reference characters. Helical grooves 106 in the push rod 78 in FIGURE 5 and grooves internally of a sleeve 108 press fit within the housing 26 coaxially with the piston 30 cooperate with ball elements (not shown) to form a "ball screw" connection. A portion 110 of the push rod 78 projecting out of the housing 26 is of a reduced diameter and of a hexagonal shape for receiving a rotatable brake actuating lever 112 held thereon as by a nut and washer assembly 114 received on a threaded end portion of the push rod 78. As obvious, rotation of the lever 112 about the longitudinal axis of the push rod 78 will cause the push rod 78 to advance the brake engaging member 32 toward the brake disc 16 (not shown in FIGURE 5). A conventional brake cable system can be used to rotate the lever 112. In this case the end of the push rod 78 engaging the brake engaging member 32 is not connected thereto so that hydraulic actuation of the brake in FIGURE 5 will not be impeded by the mechanical mechanism.

Figure 6:
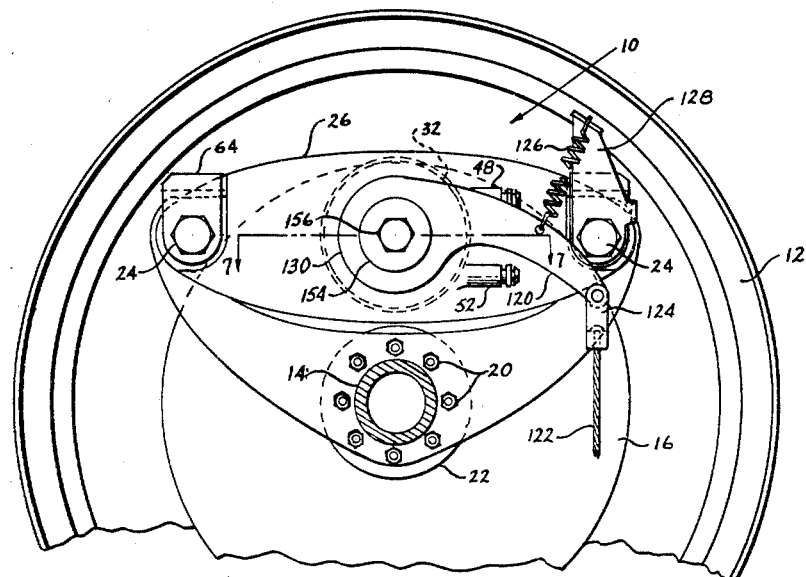
FIGURE 6 is an elevational view, with parts in cross section and parts broken away, of a vehicle wheel provided with a brake mechanism of still another embodiment in accordance with this invention.
Figures 7, 8:
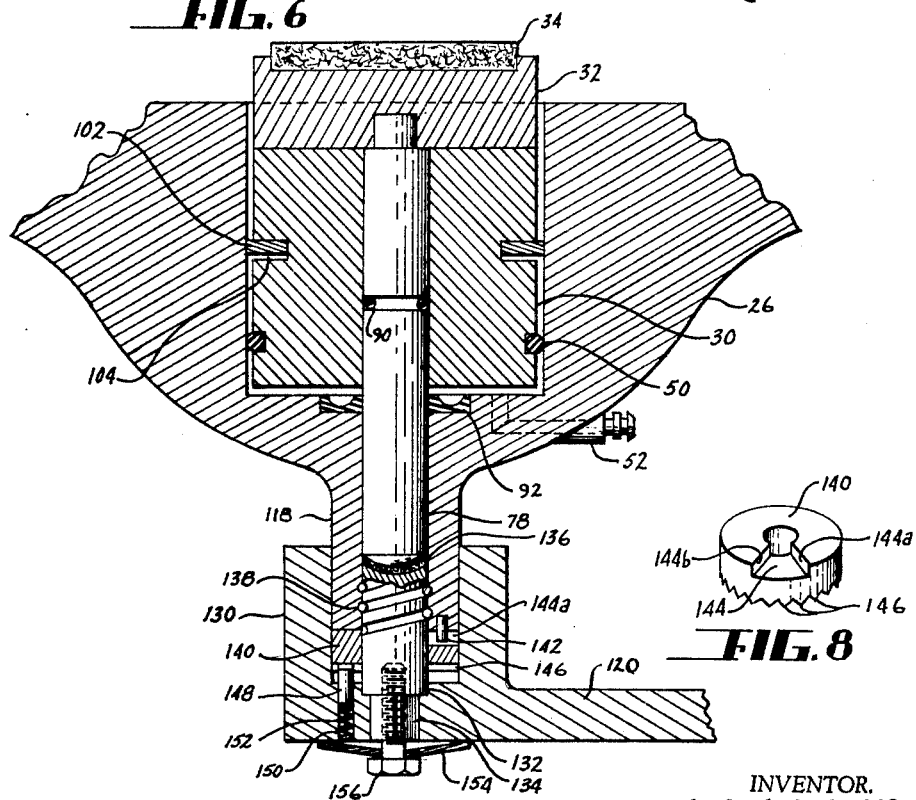
FIGURE 7 is a transverse cross sectional view of part of the brake mechanism of FIGURE 6 as viewed in the direction of arrows 7—7 thereof.
FIGURE 8 is a perspective view of a ratchet member used in the embodiment of FIGURES 6 and 7.

Referring now to FIGURES 6, 7 and 8, a more elaborate and preferred brake actuating mechanism having a lever which rotates about the longitudinal axis of the push rod 78 and piston 30 is disclosed. Again, in FIGURES 1 through 4 parts identical or nearly identical to the parts shown in FIGURES 1 and 2 are referred to by the same number. As shown in FIGURE 7, the outer end of the push rod 78 in this embodiment terminates within a sleeve extension 118 of the housing 26. As in the embodiment of FIGURES 1 through 4, the inner end of the push rod 78 is connected to or integral with the brake engaging member 32. Except for the mechanism for actuating the push rod 78 it will be appreciated that the operation of the brake mechanism of FIGURES 6 and 7 is identical to that of FIGURES 1 through 4.

Mechanical or manual operation of the brake mechanism in the embodiment of FIGURES 6 and 7 is accomplished by a brake actuating arm or lever 120 which, as shown in FIGURE 6, may be rotated in a clockwise direction by a brake cable 122 connected thereto by a clevis 124. The brake actuating arm or lever 120 is normally biased to its "home" or released position by a return spring 126 which, as shown in FIGURE 6, is connected between the lever or arm 120 and a bracket 128 mounted in fixed relation to the housing 26 by the adjacent mounting bolt 24. As shown in FIGURE 7, the brake actuating lever 120 has a cup-shaped end portion 130 axially and rotatably slidable on the sleeve extension 118. It will be observed, therefore, that the axis of rotation of the lever 120 is coincident with the longitudinal axis of the push rod 78.

Centrally located within the cup-shaped end portion 130 is a drive rod 132 which projects axially into the bore in the end of the sleeve extension 118 for engaging and axially driving the push rod 78. The drive rod 132 has a squared end portion 134 received within a square bore in the lever 120 and therefore rotates therewith. The opposite end of the drive rod 132 may have a wear pad 136 thereon for preventing metal-to-metal contact with the push rod 78. The sleeve extension 118 may be apertured or the brake actuator parts may be sufficiently loosely positioned thereon that air can flow to the cavity formed between the wear pad 136 and push rod 78 when these parts are separated.

Rotary to axial motion conversion means in the form of a ball screw arrangement 138 between the drive rod 132 and the inner surface of the sleeve extension 118 causes the drive rod 132 to be advanced toward the brake disc 16 as the lever 120 is rotated in a clockwise direction as viewed in FIGURE 6. Accordingly, upon such rotation of the lever 120, the push rod 78 will be advanced toward the brake disc 16. Because of the ball screw connection 138, the housing 26 will simultaneously be drawn away from the brake disc 16 and both brake shoes will be forcibly brought into engagement with the brake disc 16 in the manner described in connection with FIGURES 1 through 4. Advantageously, the force drawing the housing 26 away from the brake disc 16 in the embodiment of FIGURES 6 through 8 is centered on the housing 26. Therefore, there will be an equal force applied to both end portions 64 of the caliper 66.

As already mentioned, the axial travel of the push rod 78 during ordinary operation would only be about 40 thousandths of an inch and, for this reason, the rotary throw of the lever 120 would only be through a few degrees when the brakes are manually applied. After the brake linings become worn, however, the throw of the lever 120 necessarily will increase. Also, the end of the push rod 78 will gradually advance toward the brake disc 16 and away from the drive rod 132 as a result of a movement of the drag ring 102 described above in connection with FIGURES 1 through 4. Therefore, it is desirable that the home or released position of the lever 120 be occasionally adjusted or indexed in a clockwise direction to bring the drive rod 132 closer to engagement with the push rod 78. This is accomplished by interposing a ring-shaped ratchet member 140 (FIGURES 7 and 8) between the outer end of the sleeve extension 118 and the confronting surface of the cup-shaped end 130 of the lever 120. The ratchet member 140 freely rotates upon the drive rod 132 but its total rotation is limited by an abutment or stop pin 142 mounted on the end face of the sleeve extension 118 and projecting into a pie-shaped recess 144 in the confronting face of the ratchet member 140. Desirably the ratchet member 140 is so mounted relative to the stop pin 142 that, in the home or released position, the stop pin 142 engages one stop surface 144a of the recess 144. On the face opposite the recess 144, the ratchet member 140 is provided with an annular array of closely spaced ratchet teeth 146 engaged by a pawl or detent 148 slidable in a bore 150 and biased by a detent spring 152 in the bore 150 into engagement between a pair of teeth 146. The detent spring 152 and detent 148 are confined within the bore 150 by a cap washer 154 held against the back surface of the lever 120 by a bolt 156 extending into the end of the drive rod 132. The bolt 156 also serves to affix the drive rod 132 to the lever 120.

During normal operation when the brakes are to be manually applied, rotation of the lever 120 is imparted to the ratchet member 140 by the detent 148, whereupon the stop surface 144a rotates away from engagement with the stop pin 142. The throw of the lever 120 in applying the brake normally will be insufficient for the stop pin 142 to be engaged by the stop surface 144b. Should, however, the brake linings be worn to the point that the stop surface 144b engages the stop pin 142, further rotation of the ratchet member 140 will thereby be prevented and continued rotation of the lever 120 will result in the detent 148 being cammed by the sloping surface of the adjacent tooth 146 into a new position between a different pair of teeth 146. Thus, the relative positions of the ratchet member 140 and the lever 120 will be reset. When the remote brake actuating lever (not shown) is thereafter released and the return spring 126 rotates the brake actuating lever 120 in a counterclockwise direction, as viewed in FIGURE 6, the stop pin 142 will be engaged by the stop surface 144a at a position slightly clockwise of the former released position. The lever 120, accordingly, will then have a new home or released position with the drive rod 132 nearer to the brake disc 16 and such that the subsequent throw of the lever 120 in successive operations of the mechanical brake is lessened. It will be appreciated that the effective strength of the return spring 126 must be less than the effective strength of the detent spring 152 in order to cause the home or released position of the lever 120 to index gradually in a clockwise direction. It will also be understood and it is conventional to provide a brake cable system which can tolerate changes in the position of a lever such as the lever 120. Further, parts (not shown) of the brake cable system may occasionally be adjusted to reduce slack in the cable system as the lever 120 is progressively indexed by the ratchet mechanism just described.

Having thus described my invention, I claim:

1. In a brake assembly of the type having a rotatable brake disc, a brake shoe engageable with said brake disc for decelerating the rotation of said brake disc, and a brake actuating mechanism causing said brake shoe to engage said brake disc, the improvement wherein said brake actuating mechanism includes a cylinder housing, a brake piston slidable in said cylinder housing, fluid pressure means supplying a fluid under pressure into said cylinder housing causing said piston to move, mechanical force transmitting means extending through said housing and said piston for transmitting force applied thereto independently of said piston to said brake shoe, and brake applying means applying a force to said mechanical force transmitting means, said brake applying means including a brake lever mounted for rotation on said housing, a drive rod connected to said lever for rotation therewith and engageable with said mechanical force transmitting means, and rotary to axial motion conversion means interconnecting said housing and said drive rod, and the improvement further including an abutment on said housing, a ratchet member rotatable on said drive rod having spaced surfaces engageable with said abutment for limiting the movement of said ratchet member, said ratchet member having an array of ratchet teeth facing a surface of said lever, a spring biased detent member engaging said ratchet member between said ratchet teeth and fixed in relation to said lever, said brake applying means further including means for rotating said lever in a first direction to apply a force to said mechanical force transmitting means, and return means biasing said lever in an opposite direction upon release of said brake applying means, the effective strength of said spring biased detent means constraining said ratchet member to rotate with said lever being greater than the effective strength of said return means.

2. In a brake assembly of the type having a rotatable brake disc, a brake shoe engageable with said brake disc for decelerating the rotation of said brake disc, and a brake actuating mechanism causing said brake shoe to engage said brake disc, the improvement wherein said brake actuating mechanism includes a cylinder housing, a brake piston slidable in said cylinder housing, fluid pressure means supplying a fluid under pressure into said cylinder housing causing said piston to move, mechanical force transmitting means extending through said housing and said piston for transmitting force applied thereto independently of said piston to said brake shoe, and brake applying means applying a force to said mechanical force transmitting means, wherein said brake shoe has a friction lining material thereon engaging said brake disc, said friction lining material having a thickness which reduces through wear during the life of said brake lining, said piston having a peripheral groove therein, the improvement further including self-adjustment means accommodating the wear of said brake lining comprising a drag ring in said groove and pressed by force within said cylinder housing, said drag ring having an axial thickness less than the axial width of said groove and engageable by the walls of said groove and being advanced toward said brake shoe by said piston as said brake lining becomes worn, brake shoe engaging means connected to said mechanical force transmitting means located between and engaged by both said piston and said brake shoe, the position of said brake shoe engaging means due to engagement thereof by said piston being responsive to the position of said drag ring, said brake applying means including a brake lever mounted for rotation on said housing, a drive rod connected to said lever for rotation therewith and engageable with said mechanical force transmitting means, and rotary to axial motion conversion means interconnecting said housing and said drive rod, and the improvement further including an abutment on said housing, a ratchet member rotatable on said drive rod having spaced surfaces engageable with said abutment for limiting the movement of said ratchet member, said ratchet member having an array of ratchet teeth facing a surface of said lever, a spring biased detent member engaging said ratchet member between said ratchet teeth and fixed in relation to said lever, said brake applying means further including means for rotating said lever in a first direction to apply a force to said mechanical force transmitting means, and return means biasing said lever in an opposite direction upon release of said brake applying means, the effective strength of said spring biased detent means constraining said ratchet member to rotate with said lever being greater than the effective strength of said return means.

3. In a brake assembly of the type having a rotatable brake disc, a brake shoe engageable with said brake disc for decelerating the rotation of said brake disc, and a brake actuating mechanism causing said brake shoe to engage said brake disc, the improvement wherein said brake actuating mechanism includes a cylinder housing, a brake piston slidable in a cylindrical chamber in said cylinder housing, brake shoe engaging means mounted between said brake piston and said brake shoe and slidable in said cylinder housing, fluid pressure means supplying a fluid under pressure into said cylindrical chamber causing said brake piston to move, mechanical force transmitting means extending through said cylinder housing and said brake piston and connected to said brake shoe engaging means for transmitting force supplied thereto independently of said brake piston to said brake shoe engaging means and accordingly said brake shoe, brake applying means applying a force to said mechanical force transmitting means, and self-adjustment means coacting between said piston and the wall of said cylindrical chamber automatically limiting the maximum separation from said brake shoe of said piston and accordingly said brake shoe engaging means and said mechanical force transmitting means.

4. The improvement of claim 3 wherein said mechanical force transmitting means includes a push rod slidably mounted in both said cylinder housing and said piston.

5. The assembly of claim 3 wherein said brake shoe engaging means comprises a cylindrical member slidable in said cylindrical chamber and a wear pad mounted on the end of said cylindrical member engaging said brake shoe.

6. The assembly of claim 3 wherein said self-adjustment means comprises a drag ring encircling said piston pressed by force within said cylindrical chamber and located within an annular peripheral groove in said piston, said drag ring having an axial thickness less than the axial width of said groove.

7. The assembly of claim 3 wherein said brake applying means includes a brake lever mounted for rotation on said housing, a drive rod connected to said lever for rotation therewith and engageable with said mechanical force transmitting means, and rotary to axial motion conversion means interconnecting said housing and said drive rod.

References Cited

UNITED STATES PATENTS

| | | | |
|---|---|---|---|
| 2,109,284 | 2/1938 | Brinck et al. | 188—79.5 X |
| 2,612,968 | 10/1952 | Hood | 188—73 X |
| 2,820,530 | 1/1958 | Chouings et al. | 188—196 X |
| 3,132,724 | 5/1964 | Ansteth | 188—73 |
| 3,195,691 | 7/1965 | Burnett | 188—106 |
| 3,255,846 | 6/1966 | Livezey | 188—72 |
| 3,310,135 | 3/1967 | Wells | 188—73 |

FOREIGN PATENTS 1,478,442  3/1967  France.

GEORGE E. A. HALVOSA, Primary Examiner

U.S. Cl. X.R.

188—73, 196